United States Patent [19]

Tsadares et al.

[11] Patent Number: 5,096,634
[45] Date of Patent: Mar. 17, 1992

[54] METHOD OF OPERATING AN APPARATUS FOR THE PRODUCTION OF BIAXIALLY STRETCHED PLASTIC TUBES

[75] Inventors: Adonis Tsadares; Costas Anastassakis, both of Moschaton Piraeus, Greece

[73] Assignee: George Aristovoulos Petzetakis, Moschaton Piraeus, Greece

[21] Appl. No.: 651,432

[22] Filed: Feb. 5, 1991

[30] Foreign Application Priority Data

Feb. 7, 1990 [DE] Fed. Rep. of Germany ....... 4003696

[51] Int. Cl.⁵ ............................................. B29C 47/92
[52] U.S. Cl. ................................. 264/40.2; 264/40.6; 264/40.7; 264/178 R; 264/209.5; 264/288.4; 425/71; 425/140; 425/143; 425/170; 425/174.4; 425/325; 425/379.1
[58] Field of Search ................. 264/40.2, 209.5, 40.7, 264/40.1, 557–568, 288.4, 40.6, 178 R; 425/379.1, 380, 467, 325, 169, 170, 393, 140, 141, 143, 174.4, 71

[56] References Cited

U.S. PATENT DOCUMENTS

| | | | |
|---|---|---|---|
| 3,313,870 | 4/1967 | Yazawa | 264/209.5 |
| 3,947,302 | 3/1976 | Grossman | 264/162 |
| 4,663,097 | 5/1987 | Hatfield | 264/567 |
| 4,684,487 | 8/1987 | Gawrisch | 264/40.2 |
| 4,755,127 | 7/1988 | Becker | 264/40.2 |

FOREIGN PATENT DOCUMENTS

| | | | |
|---|---|---|---|
| 2357210 | 6/1974 | Fed. Rep. of Germany . | |
| 58-81126 | 5/1983 | Japan | 264/40.2 |
| 7316378 | 5/1974 | Netherlands | 264/209.5 |

*Primary Examiner*—Jeffery Thurlow
*Attorney, Agent, or Firm*—Herbert Dubno

[57] ABSTRACT

Biaxially stretched thermoplastic tubes are made in an apparatus having a plastic extruder, the output of which is controllable on an open-circuit or closed-circuit basis and which has a too head for the extrusion of a highly viscous exiting tubing, a stretching mandrel and a speed-controllable draw-off device. In the region of the run-on part there is disposed a surrounding temperature control bath for controlling the temperature of the tube to the stretching temperature while a cooling bath is disposed in the region of the draw-off part. A Raman spectrometer operating with laser waves is disposed in the zone downstream of the cooling bath. The frequency of the laser waves is adapted to the plastic used and the energy of the laser waves is so adapted to the wall thickness of the tube produced that in addition to the radiated wave scattered or reflected by the plastics, at least one wave corresponding to a Raman spectral line is radiated from the tube. The extent of axial orientation of the plastics molecules is determined from properties of the wave scattered or reflected and/or radiated from the tube.

20 Claims, 2 Drawing Sheets

METHOD OF OPERATING AN APPARATUS FOR THE PRODUCTION OF BIAXIALLY STRETCHED PLASTIC TUBES

FIELD OF THE INVENTION

Our present invention relates to a method of producing biaxially stretched tubes, i.e. tubes of thermoplastic stretched both peripherally and axially, to an apparatus for producing such tubes, and to a method of operating such an apparatus.

More particularly, the invention relates to a method of producing biaxially stretched thermoplastic, especially polyvinylchloride, tubes, using a plastic extruder whose output can be controlled on an open-circuit or closed-circuit basis with a tool head for extruding a highly viscous exiting tubing, a stretching mandrel having a cylindrical run-on part, a conical expanding part and a cylindrical draw-off part, and a variable-speed draw-off unit, the run-on part of the stretching mandrel having means for introducing a hydraulic lubricant between the tube and the mandrel, a surrounding temperature control bath for controlling tube temperature to the stretching temperature being disposed in the region of the run-on part, and a cooling bath being disposed in the region of the draw-off part. The term "tubes" is intended to include hoses.

BACKGROUND OF THE INVENTION

In the known method of German Patent Document DE-OS 23 57 210, which is the starting point of the invention, when the installation has been run in, defined extents of orientation of the plastic molecules in the axial and peripheral directions of the tubes can be achieved, for example, an axial orientation of about 20% and a peripheral orientation of more than 30%.

This stretching considerably improves the mechanical properties and, for the given mechanical properties, saves considerable material. The basic idea behind the steps of the earlier method is that a defined orientation or stretching in a plastic tube produced in an installation as described above always requires a particular temperature distribution in the tube wall which has to be stretched.

In the known process a homogeneous temperature distribution is provided in the tube wall to be stretched. This is usually a simple matter to achieve. For example the temperature adjustment is effected internally and externally in the region of the prolonged run-on part.

For inner temperature control, a heat exchange medium of an appropriate temperature is passed through the run-on part of the mandrel. For external temperature control, the plastic tube as a whole is passed through an appropriate bath the bath receptacle possibly being subdivided into a number of chambers at different temperatures.

If the hydraulic lubricant is introduced when the thermoplasticized plastic material is already in the quasi-liquid range, a drag flow of lubricant starts. This flow between the run-on cylinder and the inner wall of the tube further promotes heat transfer. Another effect is that all the volume elements of the tube to be stretched move at the same speed (without any internal transfer of material), thereby enhancing the defined temperature distribution and the maintenance thereof in the tube to be stretched.

The tube thus prepared, with its defined and very homogeneous temperature distribution, experiences a stretching or orientation of the plastic molecules substantially without sliding friction between the tube inner wall and the mandrel since the movement always take place on the lubricant which is in the form of a drag wedge of lubricating medium.

Surprisingly, the tube entrains this wedge provided that the expansion and the cooling do not occur too abruptly. The wedge forms, in longitudinal section, a skew plane and a hydraulic cushion. The wedge is prevented from detaching in the transition zone between the cylindrical run-on part and the conical expanding part. The drag flow of lubricant itself continues as far a the cylindrical draw-off part of the mandrel.

The formation of a lubricant drag flow also requires a certain quantity of the lubricant introduced. The hydraulic lubricant should be present in a substantially pressureless state at the entry. This applies particularly to entry in the quasi-liquid range. The hydraulic lubricant is therefore dragged along but is not forced in between the tube and the mandrel. This does not exclude the lubricant from being forced into the corresponding feed ducts to overcome friction losses therein.

In the known process the effect of the hydraulic lubricant is a hydrodynamic effect and not a hydrostatic effect. As previously mentioned, the plastic tube can be subjected to temperature control from the interior to the exterior in the region of the prolonged run-on part. The length thereof is such that this temperature control continues until a sufficiently defined and homogeneous temperature distribution is achieved.

Near the conical expanding part, the tube is exposed substantially to the stationary air. However, a liquid coolant can be used for cooling in this zone. In any case the tube is cooled intensively in the region of the draw-off part so that the thickness of the lubricant wedge is reduced considerably. This cooling produces considerable shrinkage of the tube. The shrinkage creates a gland effect and prevents the stretched tube from entraining any substantial quantity of lubricant. The advantage, therefore, is that the tubes can be stretched from thermoplastic materials biaxially in a very defined manner and with accurately predetermined and very substantial degrees of stretching, the molecules experiencing the biaxial orientation descried. Also, the inner diameter of the tube expanded by stretching is sized very accurately. However, the extents of orientation cannot very readily be adjusted in operation in the known process. Also, uncontrolled deviations from the programmed values may occur.

OBJECT OF THE INVENTION

It is the object of the invention so as to provide a method of operating an apparatus of the type described so that the extent of orientation is selectable at choice in operation at least in the axial direction and preferably in the peripheral direction too and can be maintained to close tolerances.

Another object of the invention is to provide an improved apparatus for producing biaxially stretched tubes.

Yet another object is to provide an improved method of making the biaxially stretched tubes.

SUMMARY OF THE INVENTION

According to the invention a Raman spectrometer is disposed in the zone downstream of the cooling bath and operates with laser waves, the frequency of which is so adapted to the particular plastic used and the energy of the laser waves being so adapted to the wall thickness of the tube produced that, in addition to the injected wave scattered or reflected by the plastic, at least one wave corresponding to a Ramon effect spectral line is radiated by the tube. The extent of the axial orientation of the plastics molecules is determined from properties o f the wave scattered or reflected and/or radiated from the tube. According to a preferred embodiment of the invention, a Raman spectrometer emitting monochromatic laser waves is used.

More particularly the method according to the invention comprises the steps of:

(a) extruding a thermoplastic tubing in a viscous state;

(b) running the tubing onto a cylindrical run-on portion of a stretching mandrel, passing the tubing next over a conical expanding portion of the mandrel, and drawing expanded tubing off from a cylindrical draw-off portion of the mandrel to biaxially stretch the tubing;

(c) controlling a temperature of the tubing at the run-on portion of the mandrel to bring the tubing to a stretching temperature;

(d) cooling the tubing at the draw-off portion; and (e) downstream of the cooling of the tubing, monitoring molecular orientation in the cooled tubing by:

directing a laser beam against the cooled tubing of a frequency selected in accordance with the composition of the thermoplastic and an energy selected in accordance with a wall thickness of the cooled tubing so that waves of the laser beam are scattered, reflected or radiated from the cooled tubing to an extent determined by the molecular orientation thereof, and by Raman spectrometry detecting, as a measure of the molecular orientation, at least one wave corresponding to a Raman-effect spectral line radiated by the cooled tubing upon impingement of the laser beam thereon.

The apparatus used can comprise:

an extruder extruding a thermoplastic tubing in a viscous state;

a stretching mandrel downstream of the extruder having a cylindrical run-on portion, a conical expanding portion of the mandrel, and a cylindrical draw-off portion of the mandrel along which the viscous tubing is drawn to biaxially stretch the tubing;

a temperature control bath contacting the tubing at the run-on portion of the mandrel to bring the tubing to a stretching temperature;

a cooling bath contacting the tubing at the draw-off portion for cooling the tubing;

variable-speed draw-off means engaging the tubing for drawing the tubing off the draw-off portion of the mandrel; and Raman spectrometer means downstream of the cooling bath for monitoring molecular orientation in the cooled tubing by:

directing a laser beam against the cooled tubing of a frequency selected in accordance with the composition of the thermoplastic and an energy selected in accordance with a wall thickness of the cooled tubing so that waves of the laser beam are scattered, reflected or radiated from the cooled tubing to an extent determined by the molecular orientation thereof, and by Raman spectrometry detecting, as a measure of the molecular orientation, at least one wave corresponding to a Raman-effect spectral line radiated by the cooled tubing upon impingement of the laser beam thereon.

By way of technological explanation of the invention it should again be stressed that according to the invention a Raman spectrometer operating with laser light is disposed in the zone downstream of the cooling bath, the frequency of such light being so adapted to the particular plastic used that a suitable spectral range of the Raman scatter spectrum is obtained without modifying the sample.

This spectrum is measured with respect to different scatter geometries X (AB) and Y (AB), where X, Y denote the directions of the incident laser beam and of the scattered light, while A, B denote their respective polarizations. The intensity and/or the polarization can be evaluated.

The transition polarizability tensor may have up to 6 independent components, so that detailed information as to orientation effects can basically be taken from the Raman spectrum. In addition, processing-conditional morphological changes can be detected. Depolarization conditions and relative Raman intensities sensitive to the axial orientation of the macromolecules are fed to a computer and compared therein with programmable set values for the axial orientation of the plastic molecules. The output of the plastic extruder and/or the speed of the draw-off device are controlled in dependence on the difference between the set value and the actual value.

We have found that in the production of extruded plastic, more particularly polyvinylchloride, tubes, Raman effect spectral lines can be used as measured value for the axial or peripheral orientation of the polymer chains if a laser wave of the appropriate frequency is used. The frequency is so chosen that the laser waves excite the minimum amount of fluorescence and penetrate into the plastic tube to a depth sufficient for a integrated measurement without distortion of the measurement result by surface textures.

The Raman effect is known. When monochromatic light impinges on a medium, most of the scattered light has the same frequency (central Rayleigh line) as the incident laser beam while a much smaller proportion has spectra components shifted from the Rayleigh peak. The frequency difference between the Raman active lines and the Rayleigh central line is known as the Raman effect line shift. It is independent of the frequency of the incident laser wave and is determined solely by the structure and state of the scattering molecules, expressed in classical terms by their polarizability.

The Raman effect spectral lines are therefore characteristic of the scattering molecules and can probe three-diminsional symmetries. A clear indication of the orientation of the corresponding molecules can be obtained in the manner described by means of a laser beam of the appropriate frequency and by means of Raman spectral lines or their polarization. Consequently, the invention provides the possibility of operationally selecting and maintaining to close tolerances the extent of orientation at least axially but preferably peripherally too, in the production of a polyvinylchloride tube.

In the case of symmetrical stretching or bending, a chain orientation and a structural variation can probably be obtained more easily. Relative intensities of the bands and splitting can be used to ascertain structural information in the biaxially stretched plastics tubes. More particularly, these values are investigated for different orientations of the drawing axes, referred to the scatter plane, i.e., the polarization of the incident laser beam is directed in the axial direction and/or peripheral direction.

To suppress objectionable background fluorescence, it is important to avoid its excitation, either by the selection of an appropriate laser frequency in the visible range or by the use of the less complicated Fourier transform Raman technique. This uses a radiation source in the form of an infrared laser with a continuous wave and uses a Fourier transform interferometer to plot the Raman spectrum. The final construction and the experimental conditions will depend primarily on the color of the polyvinylchloride tubes.

According to a feature of the invention the intensity of the radiated wave corresponding to a Raman spectral line is measured as an actual value for the axial orientation of the plastic molecules and is fed to a computer and is compared therein with programmable set values for the axial orientation of the plastic molecules and the output of the plastic extruder and/or the speed of the draw-off device are adjusted in dependence upon the difference between the set value and the actual value.

In another embodiment, polarized laser waves are used and the change of the polarization of the scattered or reflected and/or radiated waves as compared with polarization of the incident wave is determined as a measure of the axial orientation of the plastic molecules.

In a preferred embodiment, the polarization of the scattered or reflected and/or radiated wave is measured as an actual value for the axial orientation of the plastics molecules and is fed to a computer and compared therein with programmable set values for the axial orientation of the plastic molecules. The output of the plastics extruder and/or the speed of the draw-off device is adjusted in dependence upon the difference between the set value and the actual value. The measuring method making use of polarized laser waves is also known as an ellipsometric measuring method.

The steps described can also be used to control the peripheral orientation on an open-circuit or closed-circuit basis, i.e. in an open-type or closed-loop type of control system, to which end the peripheral orientation of the plastic molecules is correspondingly measured and fed to a computer and compared therein with programmable set values for the peripheral orientation of the plastic molecules and the temperature of the cooling bath and/or the temperature of the temperature control bath and/or the temperature of the stretching mandrel are adjusted in dependence upon the difference between the set value and the actual value.

In another embodiment of the method according to the invention for adjusting or controlling the axial orientation, in addition in order to adjust or vary the axial orientation of the plastics molecules, the temperature of the cooling bath and/or the temperature of the temperature control bath and/or of the stretching mandrel are varied in dependence upon the difference between the set value and the actual value.

With regard to the peripheral orientation, the procedure adopted may be that in addition, in order to adjust or vary the peripheral orientation of the plastics molecules, the output of the plastics extruder and/or the speed of the draw-off facility is varied in dependence upon the difference between the set value and the actual value. In every case it is advisable to use laser waves in the infrared range. We may also use diffuse laser waves, the intensity of the radiated Raman effect spectral line in the peripheral direction and/or in the radial direction of the tube being measured and these intensities being evaluated as a measure of the molecular orientation in said direction.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
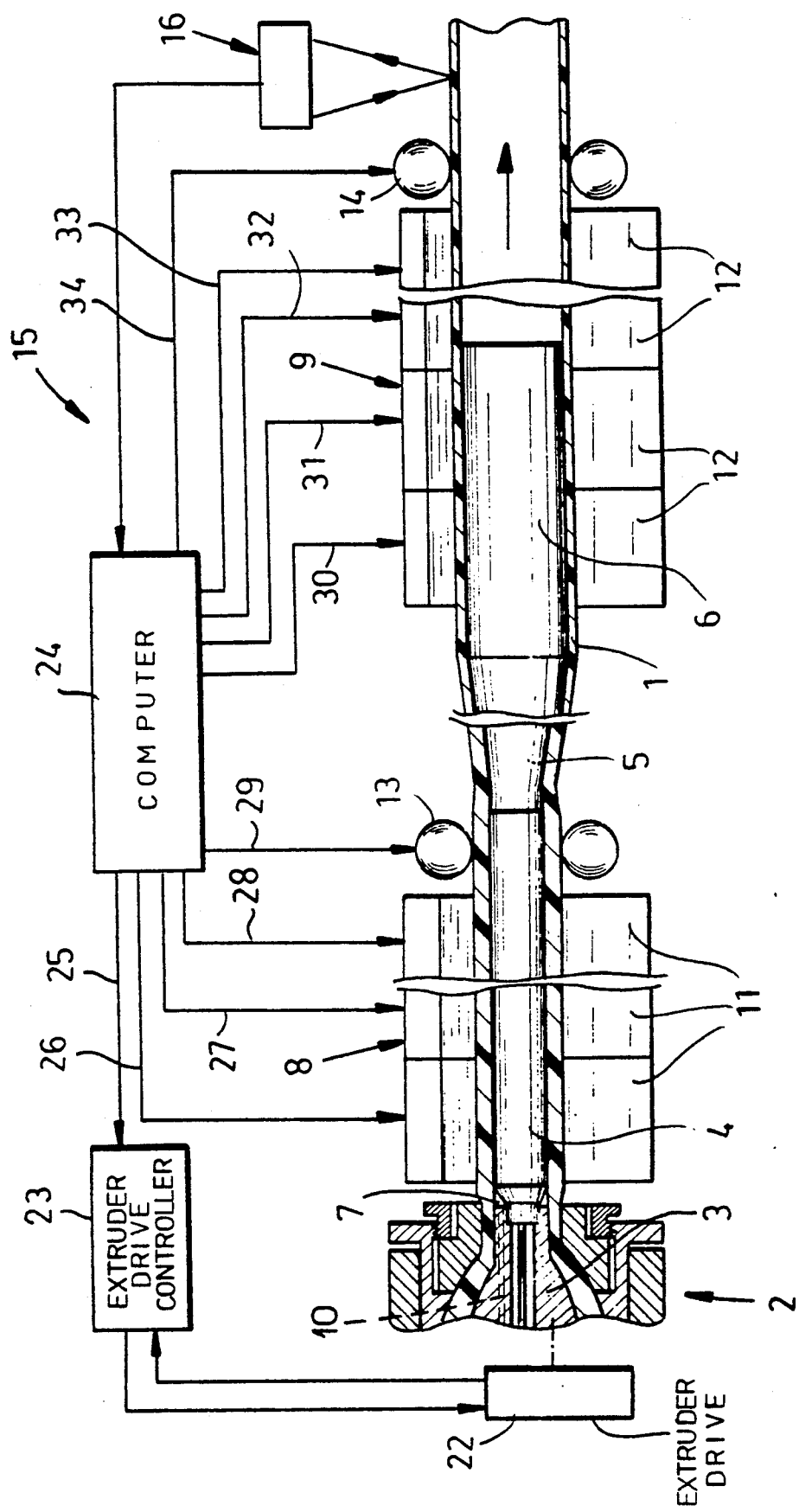
FIG. 1 is a longitudinal section through an apparatus for carrying out the method according to the invention.

The apparatus shown in FIG. 1 is used for the biaxial stretching of a tube 1 of stretchable plastics, the tube 1 being expressed, as a quasi-liquid in a highly viscous state, from an extrusion head 2 of an extruder 22 having an extruder drive controller 23. The extrusion head 20 has an extrusion mandrel 3 whose temperature can be controlled.

The table 1 is stretched over a stretching mandrel 4, 5, 6 consisting of a cylindrical run-on part 4, a conical expansion part 5 and a cylindrical draw-off part 6, the tube being externally cooled and set to form a stable tube.

The run-on part 4 is connected to the extrusion mandrel 3 (and is hence rearwardly lengthened considerably towards the extrusion head 2 as compared with known forms of construction).

A device 7 is provided for feeding a hydraulic lubricant between the tube 1 and the stretching mandrel 4, 5, 6.

A temperature-control bath 8 for controlling the temperature of the tube 1 to the stretching temperature is disposed in the region of the lengthened run-on part 4 and surrounds the latter part of the stretching mandrel 4, 5, 6 and hence the tube 1 for stretching, while a cooling bath 9 is disposed in the region of the draw-off part 6 of the mandrel 4, 5, 6.

The device 7 for introducing the hydraulic lubricant consists of a groove 7 having lubricant supply bores 10 in the extrusion head 2, the groove 7 merging conically into the surface of the run-off part 4 in the draw-off direction.

The temperature control bath is accommodated in a temperature control tank 8 having a number of temperature control chambers 11, the latter being adjustable to different controlled temperatures, by correspondingly heated temperature control liquid being introduced into said chambers 11. To this extent the temperature is controllable on an open-circuit or closed-circuit basis.

The cooling bath is correspondingly accommodate in the region of the cylindrical draw-off part 6 in a cooling tank 9 which may also comprise a plurality of chambers 12. The conical expansion part 5 is slightly conical. Its maximum diameter determines the extent of stretching in the peripheral direction. There the break between the two parts 4, 5 can be replaced by an arc or curve.

A draw-off device 13 operates after the temperature control tank 8. Its speed is substantially the same as the extrusion speed. The difference in the speed of this draw-off device 13 and of the following draw-off device 14 determines the extent of the stretching axially. The result is that in the region of the run-on part 4 which is rearwardly extended as far as the extrusion head 2 the temperature of the tube 1 is controlled to the stretching temperature, and in the quasi-liquid zone a hydraulic lubricant is introduced at 7 between the tube 1 and the run-on part 4 to form a lubricant drag flow, so that the tube 1 is guided on said flow.

In FIG. 1, open-circuit or closed-circuit control devices 15 are shown in the form of a block schematic. These devices enable the extrusion speed of the extruder, the draw-off devices 13, 14 and hence the stretching, the temperature of the liquid in the temperature control tank 8 and the temperature of the cooling liquid in the cooling tank 9 to be controlled on an open-circuit or closed-circuit basis. The open-circuit or closed-circuit control is carried out with a Raman spectrometer 16. In this connection see FIG. 2.

Figure 2:
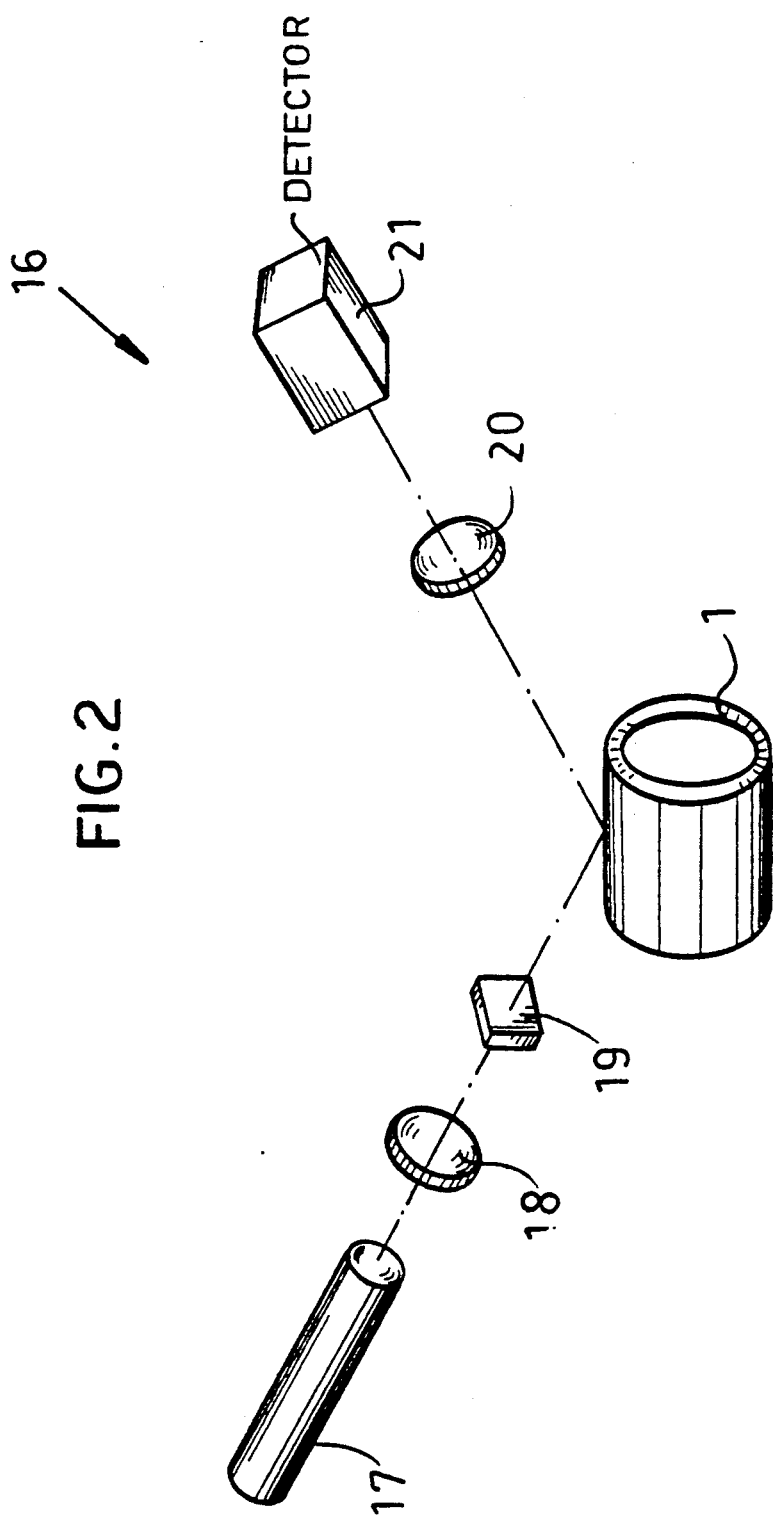
FIG. 2 is a diagram of a Raman spectrometer used in the apparatus shown in FIG. 1.

FIG. 2 shows the laser 17 of the Raman spectrometer and a polarizer 18. A quarter-wave plate 19 is disposed after the polarizer 18 as considered in the beam direction. The polarized light impinges on the surface of the plastics tube 1 as shown in the drawing. The result is a Raman spectral line. This impinges on the photoelectric detector 21 via another polarizer 20 operating as an analyzer. The operation is similar if the laser waves used are not polarized, except that the intensity of the radiated wave corresponding to a Raman spectral line is measured.

In the drawing, we have also illustrated the computer 24 which receives the output from the Raman spectrometer 16 and can control, as indicated, for example the extruder drive via the line 25, the temperatures of the temperature control baths 11 in the various compartments as indicated at 26, 27, 28, the speed with which the tube 1 is drawn over the cylindrical portion 4 of the stretching mandrel by the device 13 as represented by the control line 29, the temperatures of the cooling baths 12 in the various compartments as represented by lines 30, 31, 32 and 33 and/or the speed of the draw-off unit 14 as represented by the line 34.

We claim:

1. A method of producing a biaxially stretched thermoplastic tube, comprising the steps of:
   (a) extruding a thermoplastic tubing in a viscous state;
   (b) running said tubing onto a cylindrical run-on portion of a stretching mandrel, passing said tubing next over a conical expanding portion of said mandrel, and drawing expanded tubing off from a cylindrical draw-off portion of said mandrel to biaxially stretch said tubing;
   (c) controlling a temperature of said tubing at said run-on portion of said mandrel to bring said tubing to a stretching temperature;
   (d) cooling said tubing at said draw-off portion;
   (e) downstream of the cooling of said tubing, monitoring molecular orientation in the cooled tubing by:
      direction a laser beam against said cooled tubing of a frequency selected in accordance with the composition of the thermoplastic and an energy selected in accordance with a wall thickness of the cooled tubing so that waves of said laser beam are scattered, reflected or radiated from said cooled tubing to an extent determined by the molecular orientation thereof, and
      by Raman spectrometry detecting, as a measure of the molecular orientation, at least one wave corresponding to a Raman-effect spectral line radiated by said cooled tubing upon impingement of said laser beam thereon; and
   (f) controlling cooling of said tubing in response to the molecular orientation as monitored in step (e).

2. The method defined in claim 1 wherein the molecular orientation in the cooled tubing is monitored by training a Raman spectrometer using monochromatic light waves thereagainst.

3. The method defined in claim 1 wherein said measure is a measurement of intensity of said wave corresponding to said Raman-effect spectral line radiated by said cooled tubing upon impingement of said laser beam thereon, said measurement of intensity being fed to a computer as an actual value of axial orientation of molecules of the thermoplastic, said method further comprising comparing said actual value with a preprogrammed setpoint value for axial orientation of said molecules, and controlling at least one operating parameter from a rate of extrusion of said viscous tubing and a draw-off speed of tubing drawn off said mandrel in dependence upon a difference between said actual value and said setpoint value.

4. The method defined in claim 1 wherein said laser beam is a polarized laser beam and a change in polarization of the waves of said laser beam scattered, reflected or radiated from said cooled tubing is measured as a measurement of axial orientation of molecules of the thermoplastic.

5. The method defined in claim 4 wherein said measurement is fed as an actual value of the axial orientation of molecules of the thermoplastic to a computer, said method further comprising comparing said actual value with a preprogrammed setpoint value for axial orientation of said molecules, and controlling at least one operating parameter from a rate of extrusion of said viscous tubing and a draw-off speed of tubing drawn off said mandrel in dependence upon a difference between said actual value and said setpoint value.

6. The method defined in claim 1 wherein a peripheral orientation of molecules of the thermoplastic is measured as an actual value and fed to a comparator for comparison therein with a preprogrammed setpoint value of peripheral orientation, said method further comprising the step of adjusting at least one of said temperatures in dependence upon a difference between said actual value and said setpoint value.

7. The method defined in claim 6 wherein said tubing is fed through a temperature control bath at said run-on portion, said tubing is fed through a cooling bath at said draw-off portion, said temperature of said mandrel is controlled, and said step of adjusting at least one of said temperatures comprises adjusting one of the parameters of the temperature of said temperature control bath, the temperature of said cooling bath and the temperature of said mandrel.

8. The method defined in claim 1 wherein the monitoring of said molecular orientation provides an actual value of axial orientation which is fed to a comparator for comparison therein with a preprogrammed setpoint value of axial orientation, said method further comprising the step of at least in part controlling said axial orientation by adjusting at least one of said temperatures in dependence upon a difference between said actual value and said setpoint value.

9. The method defined in claim 8 wherein said tubing is fed through a temperature control bath at said run-on portion, said tubing is fed through a cooling bath at said draw-off portion, said temperature of said mandrel is controlled, and said step of adjusting at least one of said temperatures comprises adjusting one of the parameters of the temperature of said temperature control bath, the temperature of said cooling bath and the temperature of said mandrel.

10. The method defined in claim 9 wherein peripheral orientation of said molecules is controlled at least in part by controlling at least one operating parameter from a rate of extrusion of said viscous tubing and a draw-off speed of tubing drawn off said mandrel in dependence upon a difference between said actual value and said setpoint value.

11. The method defined in claim 1 wherein said laser beam contains waves in the infrared range.

12. The method defined in claim 1 wherein said beam contains diffuse laser waves, said method including measuring the intensity of the radiated Raman effect spectral line in at least one of the peripheral and radial directions as a measure of molecular orientation in the respective direction.

13. An apparatus for producing biaxially stretched thermoplastic tubes, comprising:
- an extruder extruding a thermoplastic tubing in a viscous state;
- a stretching mandrel downstream of said extruder having a cylindrical run-on portion, a conical expanding portion of said mandrel, and a cylindrical draw-off portion of said mandrel along which said viscous tubing is drawn to biaxially stretch said tubing;
- a temperature control bath contacting said tubing at said run-on portion of said mandrel to being said tubing to a stretching temperature;
- a cooling bath contacting said tubing at said draw-off portion for cooling said tubing;
- variable-speed draw-off means engaging said tubing for drawing said tubing off said draw-off portion of said mandrel;
- Raman spectrometer means downstream of the cooling bath for monitoring molecular orientation in the cooled tubing by:
  - directing a laser beam against said cooled tubing of a frequency selected in accordance with the composition of the thermoplastic and an energy selected in accordance with a wall thickness of the cooled tubing so that waves of said laser beam are scattered, reflected or radiated from said cooled tubing to an extent determined by the molecular orientation thereof, and
  - by Raman spectrometry detecting, as a measure of the molecular orientation, at least one wave corresponding to a Raman-effect spectral line radiated by said cooled tubing upon impingement of said laser beam thereon; and
- means responsive to said Raman spectrometer means for controlling the cooling of said tubing.

14. The apparatus defined in claim 13 wherein said laser beam contains waves in the infrared range.

15. The apparatus defined in claim 13 wherein said beam contains diffuse laser waves, said Raman spectrometer means including means for measuring the intensity of the radiated Raman effect spectral line in at least one of the peripheral and radial directions as a measure of molecular orientation in the respective direction.

16. The apparatus defined in claim 13 wherein the molecular orientation in the cooled tubing is monitored by training a Raman spectrometer using monochromatic light waves thereagainst.

17. The apparatus defined in claim 13 wherein said measure is a measurement of intensity of said wave corresponding to said Raman-effect spectral line radiated by said cooled tubing upon impingement of said laser beam thereon, said measurement of intensity being fed to a computer as an actual value of axial orientation of molecules of the thermoplastic, said apparatus further comprising means for comparing said actual value with a preprogrammed setpoint value for axial orientation of said molecules, and means for controlling at least one operating parameter from a rate of extrusion of said viscous tubing draw-off speed of tubing drawn off said mandrel in dependence upon a difference between said actual value and said setpoint value.

18. The apparatus defined in claim 13 wherein said laser beam is a polarized laser beam and a change in polarization of the waves of said laser beam scattered, reflected or radiated from said cooled tubing is measured as a measurement of axial orientation of molecules of the thermoplastic.

19. A method of operating an apparatus for producing biaxially stretched thermoplastic tubes which includes:
- an extruder extruding a thermoplastic tubing in a viscous state;
- a stretching mandrel downstream of said extruder having a cylindrical run-on portion, a conical expanding portion of said mandrel, and a cylindrical draw-off portion of said mandrel along which said viscous tubing is drawn to biaxially stretch said tubing;
- a temperature control bath contacting said tubing at said run-on portion of said mandrel to bring said tubing to a stretching temperature;
- a cooling bath contacting said tubing at said draw-off portion for cooling said tubing; and
- variable-speed draw-off means engaging said tubing for drawing said tubing off said draw-off portion of said mandrel;

said method comprising:
- downstream of the cooling bath monitoring molecular orientation in the cooled tubing by:
- directing a laser beam against said cooled tubing of a frequency selected in accordance with the composition of the thermoplastic and an energy selected in accordance with a wall thickness of the cooled tubing so that waves of said laser beam are scattered, reflected or radiated from said cooled tubing to an extent determined by the molecular orientation thereof, and
- by Raman spectrometry detecting, as a measure of the molecular orientation, at least one wave corresponding to a Raman-effect spectral line radiated by said cooled tubing upon impingement of said laser beam thereon, and
- controlling at least one of the parameters:
  - temperature of said mandrel,
  - temperature of said temperature control bath,
  - temperature of said cooling bath,
  - rate of extrusion of said viscous tubing, and
  - draw-off speed of said tubing from said mandrel,
- in accordance with said measure of molecular orientation.

20. The method defined in claim 19 wherein said measure is a measurement of intensity of said wave corresponding to said Raman-effect spectral line radiated by said cooled tubing upon impingement of said laser beam thereon, said measurement of intensity being fed to a computer as an actual value of axial orientation of molecules of the thermoplastic, said method further comprising comparing said actual value with a preprogrammed setpoint value for axial orientation of said molecules, and controlling at least one operating parameter from a rate of extrusion of said viscous tubing and a draw-off speed of tubing drawn off said mandrel in dependence upon a difference between said actual value and said setpoint value.

* * * * *